May 23, 1950 M. S. McILROY 2,509,042
ELECTRIC ANALYZER FOR FLUID-DISTRIBUTION SYSTEMS
Filed April 5, 1948 5 Sheets-Sheet 1

COMPARISON OF VOLT-AMPERE CHARACTERISTIC OF NONLINEAR AND LINEAR RESISTORS

A - NONLINEAR RESISTOR, $k=198$
B - LINEAR 50-OHM RESISTOR
C - LINEAR 36.6-OHM RESISTOR
D - LINEAR 25-OHM RESISTOR
E - LINEAR 15-OHM RESISTOR

Inventor
Malcolm S. McIlroy
Seymour Carle &
Nichols
Attorneys

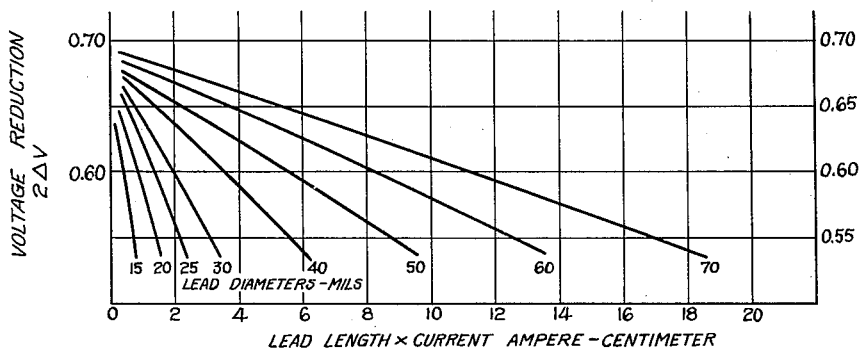
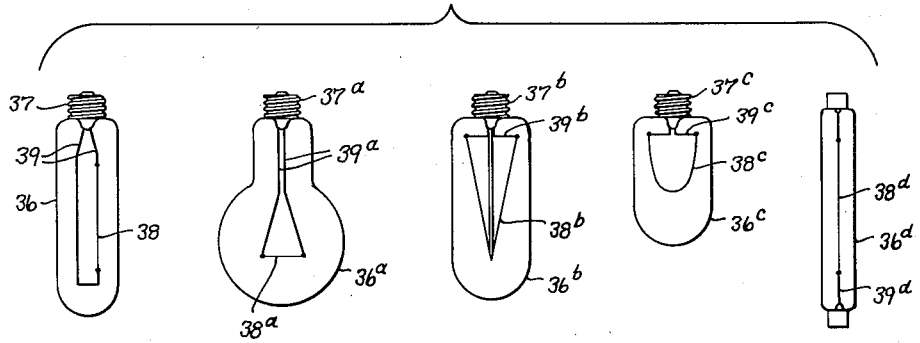
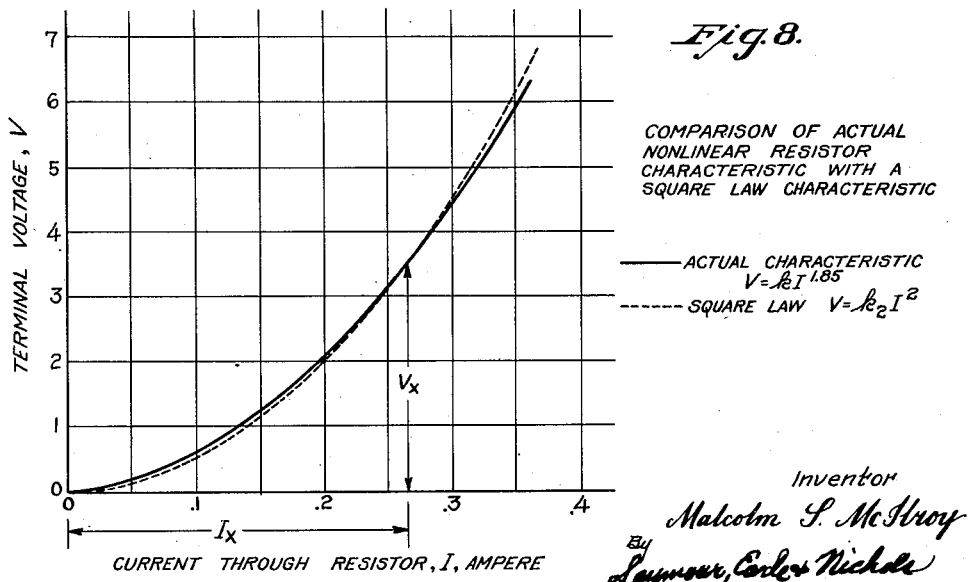

Patented May 23, 1950

2,509,042

UNITED STATES PATENT OFFICE 2,509,042

ELECTRIC ANALYZER FOR FLUID-DISTRIBUTION SYSTEMS

Malcolm S. McIlroy, Ithaca, N. Y., assignor to The Standard Electric Time Company, Springfield, Mass., a corporation of Connecticut Application April 5, 1948, Serial No. 18,923

7 Claims. (Cl. 235—61)

The present invention relates in general to distribution system analyzers and more particularly to an improved method and means for analyzing rates of fluid-flow and friction head-losses in the conduits of fluid-distribution networks.

The economical design, expansion and maintenance of fluid-distribution systems such, for example, as municipal systems for distributing illuminating gas, steam, air and water, hereinafter collectively referred to as "pipe-line networks," has been seriously handicapped by the difficulty of analyzing the flow and pressure conditions throughout the system. Heretofore, the methods of analysis have involved laborious trial and error procedures and tedious computations for each set of assumed operating conditions, and as a consequence have been seldom made.

An object of the present invention is to provide a superior method of analyzing pipe-line networks, wherein the solutions for a wide variety of assumed conditions may be obtained directly, rapidly and accurately, without requiring tedious computation of values of flow- and head-losses in the system.

A further object of the invention is to provide a superior quantitatively-analogous electric network for analyzing pipe-line networks.

A further object of the invention is to provide superior electrical resistors for use in electric networks for analyzing pipe-line networks.

A still further object of the invention is to provide superior means for analyzing a pipe-line network wherein non-linear electrical resistors are arranged in a pattern based upon the configuration of the pipe lines of the fluid-distribution system and are adapted to provide a visual check of the pressure-loss in the pipe it represents.

A still further object of the invention is to relate an electrically-analogous network to the layout of a municipal fluid-distribution system for ascertaining directly and rapidly without computational effort, the head-loss and fluid-flow in any conduit of the system in any selected section of the municipality and under any set of assumed conditions.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 4 is a graph for determining the dimensions of the leads of the non-linear resistors of this invention;

Fig. 6 shows several types of non-linear resistors for use in an electrical analogous network;

Fig. 8 is a graph showing the variation in voltage-current relationship of non-linear resistors for exponential values of 1.85 and 2.

Analogous networks

For the purpose of illustrating the present invention, the latter is shown and described as used in conjunction with the water-distribution system of a municipality but, as pointed out above, the invention may be used successfully with other types of fluid-distribution systems. Moreover, although the electrical analogy network of this invention is suitable especially for use with incompressible fluids, it may be used with equal success with fluids wherein the density varies significantly, as hereinafter described.

The pipe-line network of a municipality—whether small or large—is patterned, in general, on the layout of the streets and hence, in most instances, consists of a plurality of substantially-parallel pipe lines running in one direction and a plurality of substantially-parallel pipe lines running in a direction at substantially right angles to and intersecting the first set of pipe lines, thereby forming a plurality of interconnected substantially rectangular closed circuits.

Figure 1:
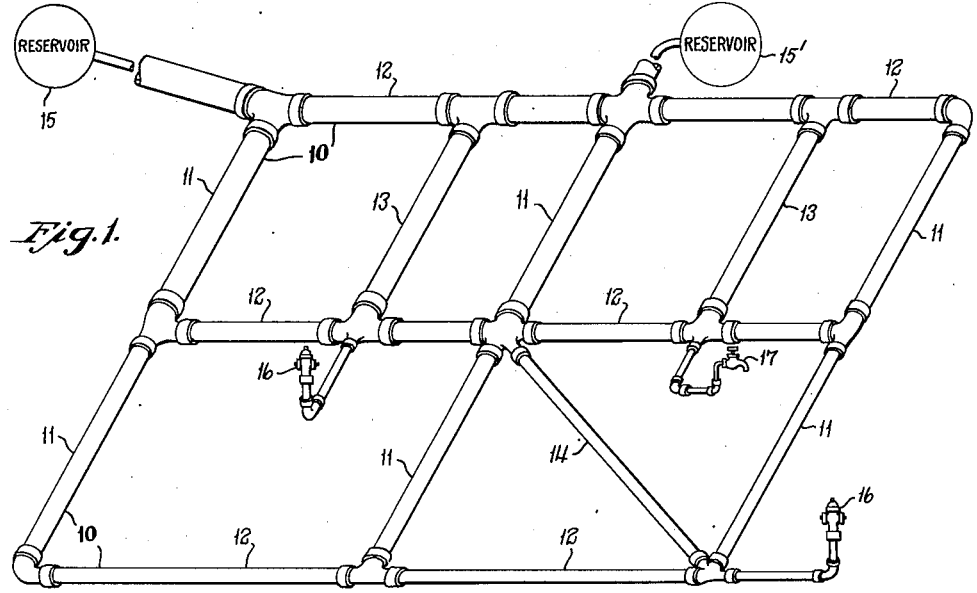
Fig. 1 is a schematic perspective view of a simple fluid-distribution system showing the individual pipe-lines arranged generally in the form of rectangles corresponding to the arrangements of the streets of a city.

Fig. 1 illustrates a simple conventional pipe-line network 10, or a fragmentary portion thereof, such as might be found in a relatively small community, the network consisting of three spaced-parallel pipe lines 11 arranged at substantially right angles to the pipe lines 12 and intersecting the latter at opposite ends thereof and at intermediate points, to form four closed substantially-rectangular pipe-line circuits 11, 11—12, 12. In the illustration, each of the upper two rectangular pipe-line circuits of the network is divided into two smaller rectangular pipe-line circuits by means of a branch pipe line 13, while a third rectangular pipe-line circuit of the network is divided into two triangular pipe-line circuits by a diagonal branch pipe line 14. Water is supplied to the network from two sources, as indicated at 15 and 15', which may comprise reservoirs, tanks, pumping-stations, or the like, arranged to feed water to the pipe lines of the network. The number of sources may be, however, more or less than two. The water may be withdrawn from the network at many points, as exemplified by the hydrants 16 and the faucet 17.

The ability of any water-distribution system to render adequate service depends upon the pressures maintained at the points of supply, the plan and altitude of the pipe-line network, the length, diameter and condition of its many water pipes, and the locations and rates of water draw-offs. For any given set of these conditions, a rapid, accurate and convenient method and means for determining the values of flow- and friction head-losses in a pipe-line network are of vital importance to engineers and superintendents who are responsible for the design and maintenance of a municipal water system; and of equal consequence to fire insurance companies and to the fire department heads of the municipality.

Early attempts to analyze a pipe-line network by electrical means were based, in particuuar, on Kirchhoff's laws for electrical networks which, in substance, are as follows:

1. "The algebraic sum of the currents flowing toward any point in a network is zero."
2. "The algebraic sum of the products of current and resistance in each of the conductors in any closed path in a network is equal to the algebraic sum of the electromotive forces in that path."

A more convenient statement of the first law is that the sum of the currents approaching a junction, equals the sum of the currents leaving it, which means then that an electrical network inherently meets the first fundamental requirement of a pipe-line network, namely, that the sum of the fluid-flows approaching the intersection of two or more pipe-lines equal the sum of the fluid-flows leaving it.

The second of Kirchhoff's laws is based on the assumption that Ohm's law applies to all the resistors along the closed path in question, that is to say, that all the resistors in the circuit have resistances which are constant regardless of the values of current through them. However, as set forth below, for purposes of making a correct electric analysis of a pipe-line network, the resistances of the network elements should bear a non-linear relationship to the current and voltage directly analogous to the head-loss flow characteristics of a pipe line. With this distinction in mind, a more appropriate way of expressing Kirchhoff's second law would be:

"The algebraic sum of the voltage drop across the resistors taken in one direction of traverse around any closed path in a network is equal to the algebraic sum of the electromotive forces tending to cause current to circulate in the direction of traversing the closed path."

As used in the foregoing expression, the term "electromotive force" means a rise in the voltage such as caused by a battery or generator, while the term "algebraic sum" means that a voltage drop across the resistor is positive when it corresponds to the direction of traverse, and negative when opposite to the direction of traverse.

Thus, the second of Kirchhoff's laws will be seen to be directly analogous to the second fundamental requirement of pipe-line networks, namely, that the algebraic sum of the friction head-losses taken in one direction of traverse around any closed circuit of the network, equals the algebraic sum of the head-rises (such as caused by pumps) in the direction of traverse. Hence, a network consisting of electrical non-linear resistors and electromotive forces inherently meets the requirements for duplicating the relationship between head-losses and rises in a pipe-line network.

Figure 2:
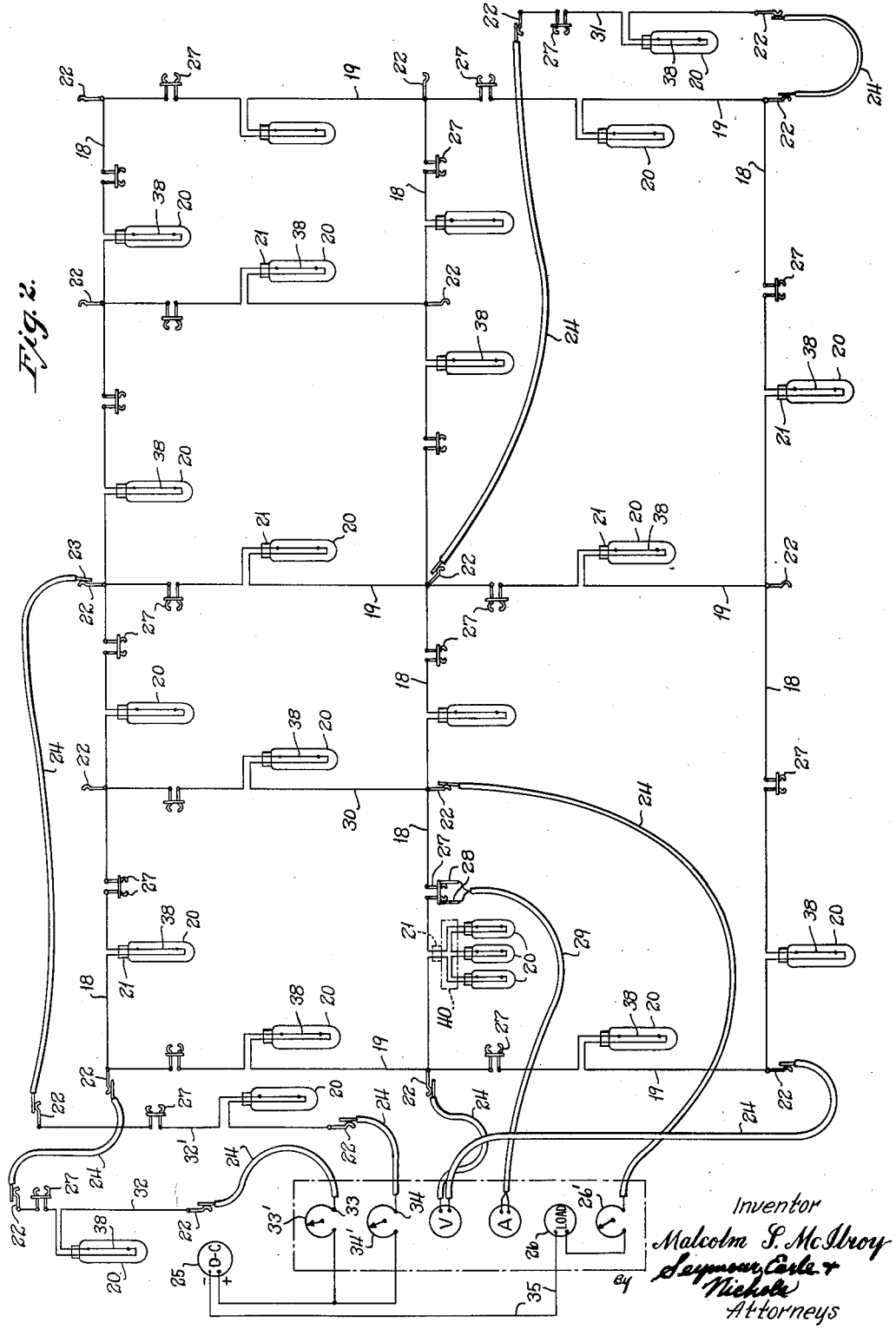
Fig. 2 is a schematic view of an electrical network set up to be directly analogous to the pipe-line network shown in Fig. 1 and including the improved non-linear resistors of this invention.

Thus, an electrical network such as shown schematically in Fig. 2 and comprising a plurality of closed substantially rectangular circuits consisting of intersecting conductors 18 and 19 respectively assembled in a configuration analogous to that of the pipe-line network shown in Fig. 1, will fulfill the flow and head-loss relations of the aforesaid pipe-line network. And, further, the introduction into the electric network of the novel non-linear resistors of this invention, indicated generally at 20 and hereinafter described, and having volt-ampere characteristics analogous to the head-loss-flow characteristics of the respective pipe lines they represent, meets all requirements for an exact analogy of the pipe-line network.

Figure 3:
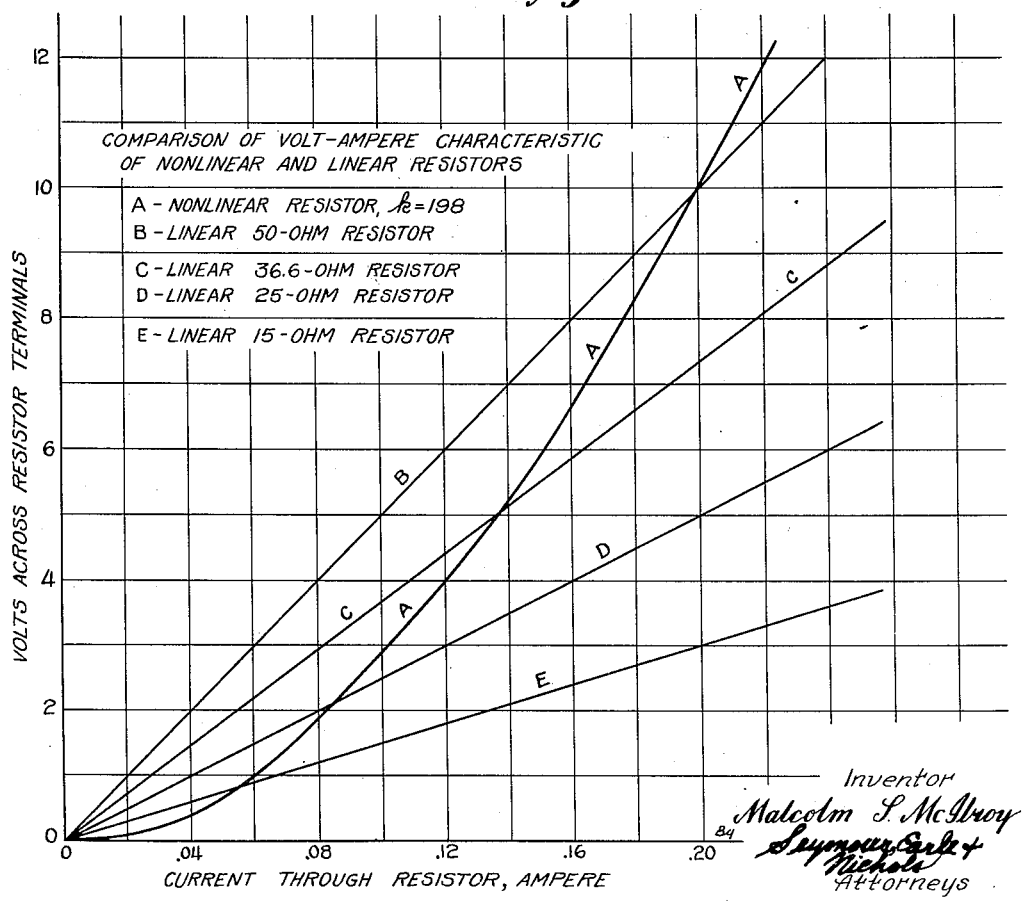
Fig. 3 is a graph comparing the voltage and current characteristics of non-linear and linear resistors.

At this point it might be mentioned that electric network analyzers having standard linear resistors have been used for analyzing electric power-transmission networks. However, by referring to Fig. 3, it will be immediately apparent that a standard electric network analyzer will not provide a correct analysis of a pipe-line network, except by successive approximation methods. Fig. 3 is a graph showing a comparison between the volt-ampere characteristics of a non-linear resistor of this invention and those of standard linear resistors. The standard linear resistors used in electric power-system analyzers have the characteristics indicated by any one of the four straight lines B, C, D or E, each of these resistors obeying Ohm's law, whereas the novel non-linear resistors of this invention have the characteristic indicated by the curved line A, the voltage of the non-linear resistor being proportional to an exponential power of the resistor current over a significant range of operation. To illustrate the inadequacy of a linear resistor for analyzing a pipe-line network, let a 25-ohm linear resistor (line D) be selected to represent a pipe line whose analogous resistor should have a coefficient of 198. Then, if the current through the linear resistor happens to be about 0.088 ampere (at the intersection with curve A of a non-linear resistor having a coefficient of 198), the voltage across the linear resistor would be nearly correct. However, if the current should be 0.12 ampere, the voltage across the linear resistor would be only 75% of its proper value, and if the current should be 0.04 ampere, the voltage would be about double the proper value.

In short, except for one isolated instance, the voltage drop across a linear resistor is non-analogous to the friction head-loss of the pipe line it represents throughout substantially its entire range of operation.

The head-loss-flow characteristics of a pipe line are often expressed by the following form of the Williams and Hazen empirical formula:

$$H = zQ^{1.85} \quad (1)$$

where

H equals the friction head-loss in feet of water for the full length of pipe.
z equals the head-loss coefficient of the pipe line which depends upon length, diameter and the smoothness of the pipe, as indicated by the value assigned to the Williams and Hazen smoothness coefficient C.
Q equals the rate of flow of water in gallons per minute.

This formula is widely used in preference to Darcy's law, since it does not require that the value of the friction factor for each pipe be altered as a function of fluid velocity, the exponential value 1.85 of the Williams and Hazen formula accounting for the average variation of friction factors over a wide range of fluid velocity for many pipes. As pointed out above, the present invention permits an electrical network to be made directly analogous to the pipe-line network it represents by providing the network with novel non-linear resistors in each of which the relationship of voltage to current is analogous to the loss of head and fluid flow-rate of a pipe-line, as expressed by the Williams and Hazen formula supra.

This relationship between the voltage and the current of each non-linear resistor of the electric network may be formulated as follows:

$$V = kI^{1.85} \quad (2)$$

where k equals a constant proportional to z of the Williams and Hazen formula and is hereinafter referred to as the coefficient of the non-linear resistor.

The foregoing discussion of the relationship between the voltage and current of a non-linear resistor has pertained particularly to resistors used in a pipe-line network for a non-compressible liquid.

It has been found, moreover, that non-linear resistors having these same voltage-current chracteristics are applicable with equal success to electrical networks for directly analyzing the flow of a gas of substantially-constant density in a gas-line network. Thus, the general expression for the relation between pressure and flow-rate for a constant-density gas flowing in a pipe line is:

$$P_1^2 - P_2^2 = kfQ_a^2 \quad (3)$$

where $P_1$ and $P_2$ are the absolute pressures of the flowing fluid at the ends of a pipe line,
f equals the friction factor of the pipe line,
k is a constant determined by the dimensions and condition of the pipe,
$Q_a$ is the flow-rate.

From which it follows that:

$$\Delta P = \frac{k}{2P_{avg.}} fQ_a^2 \quad (3a)$$

where $\Delta P$ equals the difference in pressure between the ends of the pipe line.

This equation may be rewritten to combine the symbols $$\frac{kf}{2P_{avg.}}$$

into a single coefficient $z'$, as follows:

$$\Delta P = z' Q_a^{1.85} \quad (4)$$

The latter equation accounts for the variation of the friction factor with fluid velocity and is identical in form to Equation 2 above. Hence, the equation may be represented in an electric network by an analogous non-linear resistor.

For a gas whose density varies appreciably throughout the network, a simplified expression of the relation between pressure and flow-rate for the gas in any pipe line of the network is:

$$P_1^2 - P_2^2 = k'Q_a^{1.85} \quad (5)$$

Expressed in words, the above equation states that the 1.85 power of the mass flow-rate referred to standard conditions between the ends of a pipe line conducting a gas of variable density is proportional to the difference in the squares of the absolute pressures at the ends of the pipe line. Written in terms of the voltage and current of a non-linear resistor in an analogous network:

$$V_{12} = kI_{12}^{1.85} \quad (6)$$

where $V_{12}$ equals the voltage across the terminals 1,2 of the resistor; and
$I_{12}$ equals the current through the resistor.

To recapitulate, by selecting non-linear resistors having coefficients analogous to the coefficients of the pipes of the pipe-line network being analyzed, the non-linear resistors will provide an exact analogy to a generally accepted relation between the friction head-loss and fluid flow-rate in the pipe-line network for both liquids and gases.

In the selection of non-linear resistors for analyzing a pipe-line network distributing an incompressible fluid, the voltage drop across any non-linear resistor is related to the head-loss in the corresponding pipe line of the net work by a scale factor B where:

B = V/H volts per foot friction head-loss

Similarly, the current I is related to the fluid-flow rate Q by a scale factor G where:

G = I/Q amperes per gallon per minute

And, if $\lambda$ is the scale factor between values of the coefficients k for the non-linear resistors and the coefficients z for corresponding pipe-lines, then:

$$\lambda = k/z$$

and since $$k = \frac{V}{I^{1.85}} \text{ and } z = \frac{H}{Q^{1.85}}$$

then $$\lambda = \frac{V}{H}\left(\frac{Q}{I}\right)^{1.85} = \frac{B}{G^{1.85}}$$

As a specific example, if for a particular analysis, the basic scale factors chosen are:

B = 0.5 volt per foot head-loss; and
G = 2×10⁻⁴ ampere per gallon per minute of flow; then
$\lambda = 3.48 \times 10^6$ Assume that the pipe line to be represented by a non-linear resistor is 450 feet long, 8 inches in diameter, and has a smoothness coefficient 80 giving a corresponding head-loss coefficient $z$ of $5.71 \times 10^{-5}$. Then, the coefficient $k$ of the non-linear resistor selected for representing that particular pipe line would be:

$$k = \lambda z = (3.48 \times 10^6)(5.71 \times 10^{-5}) = 198$$

In a similar manner, every other pipe of the pipe-line network may be represented by an appropriate non-linear resistor of the electric network. A similar procedure is employed in finding the scale factor to apply to a network for distributing compressible fluids.

Referring again to Fig. 2 which shows schematically an electric network analogous to the fluid network of Fig. 1, the electric network comprises the aforesaid conductors 18 and 19, each being provided with a suitable socket 21 to receive a non-linear resistor 20 located between junction-jacks 22 at the intersection of the conductors, the jacks being preferably the so-called "dead front" type of female single-pole jack of well known manufacture. Each junction-jack 22 is adapted to receive the male plug 23 of a flexible jumper or patch-cord 24, these cords being used as needed to connect the various junction-jacks 22 of the network with a source and load, as indicated generally at 25 and 26 respectively. Moreover, the patch-cords 24 are adapted to be used to connect a voltmeter V across any two junction-jacks of the network for determining the friction head-loss of the equivalent pipe line of the pipe-line network of Fig. 1, as hereinafter described. For determining the rate of fluid-flow in each pipe line, the corresponding conductor of the electric network is provided with a current-diverting jack or relay, indicated generally at 27, whereby an ammeter A may be connected into the corresponding conductor of the electric network. Each current-diverting jack 27 is preferably a "dead front" type two-pole female jack which is normally closed, and designed to permit the two-pole male plug 28 of an ammeter patch-cord 29 to be inserted therein without interrupting the flow of current through the conductor.

In the network of Fig. 2, the analogy between the basic substantially rectangular electric network and the pipe-line network is maintained by a permanent conductor 30 between the conductors 18—18 of the upper left-hand rectangular circuit (analogous to the pipe 13 of the pipe-line network); and by connecting an auxiliary conductor 31 between junction-jacks 22 of the lower right-hand rectangular circuit of the electric network (analogous to the diagonal pipe 14 of the pipe-line network) by means of patch-cords 24, both the conductor 30 and the auxiliary conductor 31 having a non-linear resistor 20 and a circuit-diverting jack 27 connected in series therein.

The sources 15 and 15' of fluid-flow of the hydraulic network 10 are represented in the analogous electric network of Fig. 2 by source-terminals 33 and 34 of rheostats 33' and 34' respectively connected in series with a source-device 25 which may be an electric generator, rectifier, battery or an adjustable resistor, energized from a power supply for supplying direct current to the network. As indicated in the drawing, the source-terminals 33 and 34 are not a permanent part of the electric network, but are adapted to be connected to any one of the junction-jacks 22 of the network by means of patch-cords 24 and auxiliary circuits 32 and 32' respectively connected in series therewith, the latter being analogous to the respective pipes connecting the reservoirs 15 and 15' to the pipe-line network. The withdrawal of fluid from the hydraulic network as, for example, by the hydrant 16 of its lower left-hand rectangle, is represented in the electrical analogous network by a load comprising the energy-dissipating or storage device 26 such, for example, as an electronic circuit arranged to hold the current at or near a desired steady value, an adjustable resistor, a storage battery, a motor generator set, a ballast lamp, or any suitable combination of these devices, the load 26 being connected to the designated junction-jack of the network by a flexible patch-cord 24 and a rheostat 26' connected in series therewith. A return path 35 is provided from the load 26 to the direct current source 25. Although in the schematic illustration of Fig. 2 only one load 26 is shown, it will be appreciated that in practice, a plurality of loads would be made available for simulating the loads on a pipe-line network.

*Non-linear resistors*

In general, the design of the non-linear resistors 20 to be used in the above described network is based upon the knowledge that the resistance of most conductors of electricity varies with the temperature of the conductors; and the concept that if a resistor can be designed whose temperature is related to the current through it in a suitable manner, and whose resistance is likewise related properly to its temperature, the desired relation between the voltage and current, as expressed in Formula No. 2 above, may be achieved.

Moreover, it is necessary that the resistors be designed so that while all of the resistors obey the foregoing voltage-current relationship, yet each resistor will be characterized by its individual coefficient $k$ corresponding to the coefficient $z$ of a given pipe line, as pointed out above, whereby the proper resistor may be inserted in the electric network corresponding to that particular pipe line of the pipe-line network.

Through extensive research and experimental investigation, the development of resistors having electrical characteristics analogous to the fluid-flow and head-loss characteristics of selected pipe lines over the necessarily tremendous range of coefficients $k$ required for pipe-line network analysis, has been accomplished.

In general, these resistors constitute lamps comprising an evacuated glass tube or bulb, indicated generally at 36 (see Fig. 6), having an insulated base-portion 37 and enclosing a filament 38, the opposite ends of which are connected to suitable leads 39 secured in the base 37 of the bulb. Since the rise in temperature of the filament of the resistor is to be used as the means of obtaining a variable resistance, stability of operation dictates that the filament be enclosed within an evacuated enclosure. The preferred material for the filament is tungsten wire, a characteristic of tungsten wire being that when conducting current, the voltage across the central portion of the wire filament, that is to say, that mid-portion of the filament which reaches a stable maximum temperature corresponding to radiation alone and which is unaffected by cooling from the leads at opposite ends of the filament, and hereinafter referred to as a "long" filament, varies very nearly as the 1.63 power of the current through the filament over a wide range of temperatures and currents; and that by introducing a prescribed degree of cooling into the long filament by means of its leads, the exponential relation of voltage and current may be raised to 1.85. Where the mid-section temperature is lower than the temperature corresponding to free radiation, the filament is known as a "short" filament.

Although the cooling effect of the leads of the long filament are a preferred expedient for raising the value of the exponent from 1.63 to 1.85, it is within the purview of the invention to include other methods and means for raising this exponent especially to values higher than 1.85; thus, for example, by electrolytically coating a filament with platinum black; by increasing the ratio of surface perimeter to cross-sectional area of the filament; or by using a gas-filled lamp.

Still other criteria in the design of the resistors are that as between a "short" and "long" filament, the long filament insures a wide range of operating currents for a constant exponent of 1.85, whereas a short filament has a limited range of operation and a variable exponent. Moreover, for a given filament modulus, the exponent 1.85 may be made exact at different values of free radiating temperature by slight changes in filament dimensions. Further, the ratio of the half length of the filament to a quantity $a$ which is a function of the filament diameter and of the free radiating temperature of a long filament, is referred to as the filament modulus and has been found to mark the boundary between the long and short ranges of operation of any filament. If its value is not less than 2.8, the filament is long, whereas, if its value is less than 2.8, the filament is short. An inspection of a number of characteristic curves showing relationship between a given filament modulus and the exponent of the filament for different values of free radiating temperature discloses that a very satisfactory combination of range of operation, together with the proper value of exponent, namely 1.85, may be achieved by using a filament whose modulus has a value of 7.36 at a free radiating temperature of 2800° Kelvin and a length such that its characteristic satisfies Equation No. 2, at a current corresponding to a free radiating temperature of 2800° Kelvin.

In brief, the design of the non-linear resistors for an electrically analogous network requires the careful selection of the diameters and lengths of the two major components, namely, the leads and the filaments.

*Lead design*

The dimensions of the leads of the filament fix for all filament diameters alike and for any value of current, the reduction in filament voltage caused by cooling from the leads. This reduction may be expressed graphically for any lead diameter as a plot of voltage reduction $2\Delta V$ (the two accounting for the use of two leads) as a function of the product of lead length and current. A typical graph is shown in Fig. 4. Experiment has shown that the above plot must be limited so that the temperature of the lead-filament junction does not exceed 1000° K., above which value heat radiation from the leads becomes significant. However, within this limitation a wide variety of lead dimensions makes little difference in the filament characteristics, the cooling of the leads causing a reduction in filament voltage of only about 0.55 volt when the free radiating filament temperature is 2800° K.

*Filament design*

The selection of the dimensions of the filaments of the resistors is based upon the theory derived below.

Let the maximum temperature of a filament, that is, the temperature at its longitudinal mid-section, be $T_m$, measured in degrees Kelvin. The voltage per unit length of the filament at the temperature $T_m$ is $V_m'$. Then, for a filament whose length is $L_F$ centimeters, $$V_m' = V_m/L_F \qquad (7)$$

where $V_m$ is the total voltage that would be present across the filament if the entire filament operated at the temperature $T_m$. The value of $V_m'$ is determined from the expression:

$$V_m' = V'/\sqrt{D_F} \qquad (8)$$

in which $V'$ is the specific voltage for the temperature $T_m$, and $D_F$ is the filament diameter in centimeter. The specific voltage $V'$ is a standard property of tungsten; it is the voltage per cm. length of a tungsten filament one cm. in diameter. The filament current $I$ corresponding to the maximum temperature $T_m$ is:

$$I = A' D_F^{3/2} \qquad (9)$$

where $A'$ is the specific current in the Jones and Langmuir tables, corresponding to the temperature $T_m$.

As shown in Fig. 4, the value of the voltage reduction $2\Delta V$ at $T_m = 2800°$ K. is approximately 0.55 volt for the usual product of current and lead length at that temperature. The total filament voltage that would be present if the temperature of the entire filament were $T_m$ is the sum of the actual filament voltage $V_F$ and $2\Delta V$. Therefore, $$V_m = V_F + 2\Delta V \qquad (10)$$

or, from Equation 7, $$V_m' L_F = V_F + 2\Delta V \qquad (11)$$

Since the filament voltage is required to conform to the characteristic given in Equation 2, the exponential form $kI^{1.85}$ may now be substituted for $V_F$ in Equation 11 to give $$V_m' L_F = kI^{1.85} + 2\Delta V \qquad (12)$$

As previously discussed, the desired performance characteristic over a suitable operating range occurs if the filament modulus at 2800° K. is 7.36; hence $$\frac{L_F}{2a} = 7.36 \qquad (13)$$

in which, at $T_m = 2800°$ K., the value of $a$ is $$a = 0.275 \sqrt{\frac{D_F}{0.01}} \qquad (14)$$

If Equation 13 is substituted in Equation 12, one obtains $$V_m' \times 14.72a = kI^{1.85} + 2\Delta V \qquad (15)$$

The value of the specific voltage $V'$ at 2800° K. is $199.5 \times 10^{-3}$ volts cm.$^{-1/2}$. Let this value be employed in the form given in Equation 8, in place of $V_m'$ in Equation 15, and also substitute the value of $a$ from Equation 14. One then obtains $$\frac{199.5 \times 10^{-3}}{\sqrt{D_F}} \times 14.72 \times 0.275 \sqrt{\frac{D_F}{0.01}} = kI^{1.85} + 0.55 \qquad (16)$$

The solution of Equation 16 for the filament current corresponding to a maximum temperature $T_m$ of 2800° K. gives the current as a function of the non-linear resistor coefficient $k$. The following expression is thus the fundamental derived relation upon which the design of the non-linear resistor filaments depends:

$$I_{28} = \left(\frac{7.55}{k}\right)^{\frac{1}{1.85}} \text{ amp. at } T_m = 2800° \text{ K.} \quad (17)$$

After the value of filament current corresponding to a desired value of the coefficient $k$ and a maximum filament temperature of 2800° K. is known, one can determine the corresponding filament diameter by rearranging Equation 9 to give $$D_F = \left(\frac{I_{28}}{A'}\right)^{2/3} = \left(\frac{I_{28}}{1849}\right)^{2/3} \text{ cm.} \quad (18)$$

In Equation 18, the value 1849 for $A'$ is taken from the Jones and Langmuir tables which relate filament diameter and specific current. To employ this equation in selecting a diameter corresponding to a certain value of the coefficient $k$, one must first use Equation 17 to find the value of the current at $T_m = 2800°$ K.

For any two values of $k$, one may find corresponding values of $I_{28}$ from Equation 17, and may plot a relation between these two quantities as a straight line on logarithmic cross-section paper. For example, the values of current at $T_m = 2800°$ K. which correspond to values of the coefficient $k$ of .10 and 100 are, respectively, 10.3 and .249 amperes. A plot constructed in this manner is shown as the line A of Fig. 5. Having found the two values of current, one then finds corresponding filament diameters from Equation 18; in the example cited here, the diameters are respectively, .0315 cm. (12.4 mils) and .00264 cm. (1.04 mils). A straight line on logarithmic paper between these two values relates all filament diameters to resistor coefficients, as shown by line B of Fig. 5.

To find a relation between filament length and resistor coefficient, one rearranges Equation 12 in the form $$L_F = \frac{kI^{1.85} + 2\Delta V}{V_m'} \quad (19)$$

The product $kI^{1.85}$ is shown in Equation 17 always to have the value of 7.55 volts, at the value of $T_m$ of 2800° K. as used in the filament design, and the value of $2\Delta V$ is always about 0.55 volt. Therefore, combining Equations 19, 8 and 18, one obtains $$L_F = \frac{7.55 + 2\Delta V}{V_m'} = \frac{8.10\sqrt{D_F}}{V'} = \frac{4.75}{k^{0.18}} \text{ cm.} \quad (20)$$

At values of the coefficient $k$ of .10 and 100 as above, one finds filament lengths of 7.18 centimeters and 2.09 centimeters respectively. The dotted line C in Fig. 5 drawn through these two points, relates filament length to resistor coefficients $k$.

Figure 5:
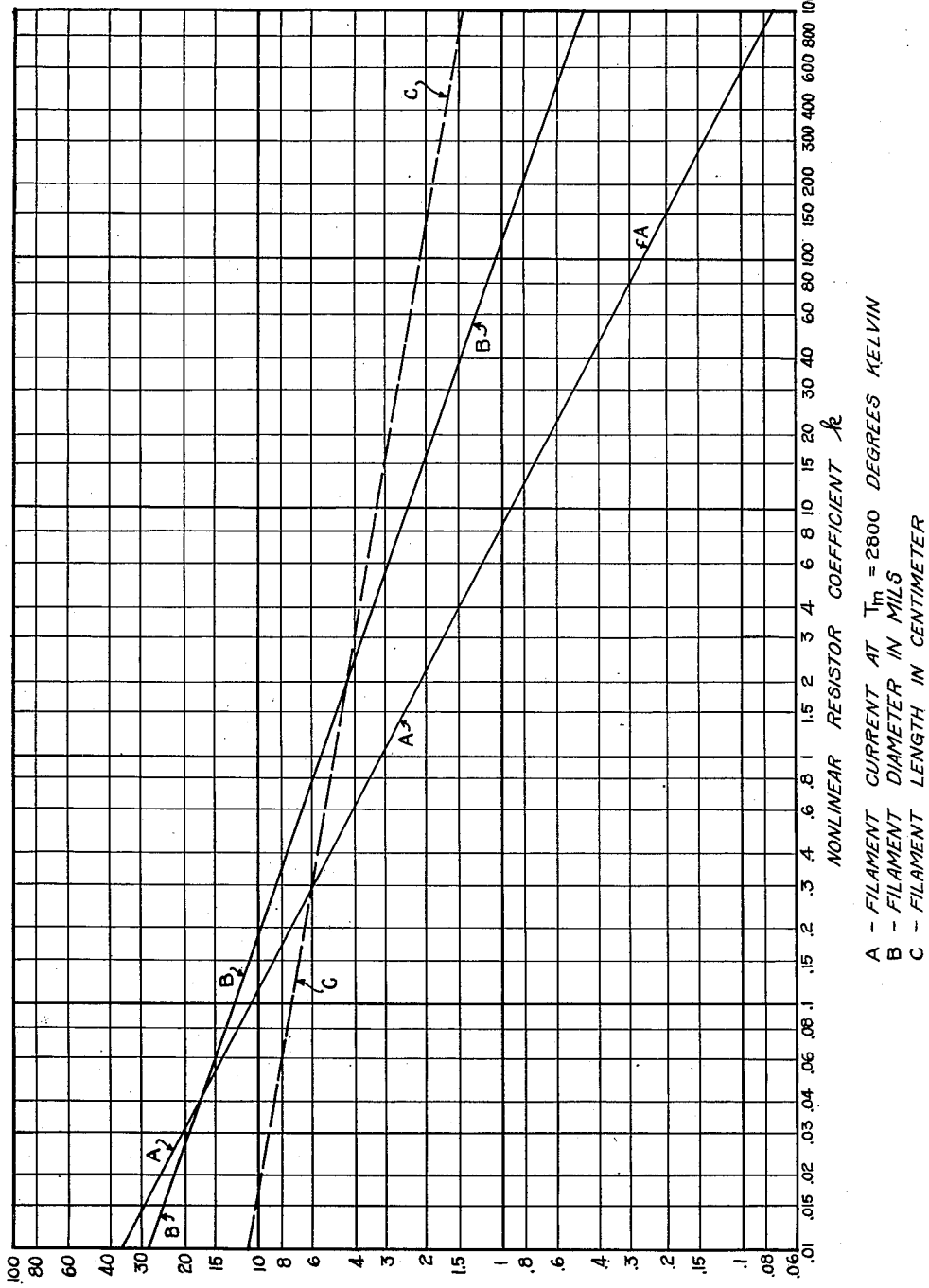
Fig. 5 is a graph for determining the theoretically correct dimensions of the filaments of the non-linear resistors.

According to Fig. 5, one could select the dimensions of any filament directly from the desired value of the coefficient. However, two difficulties prevent the outright use of these graphs for designing a filament. The first is that tungsten wires for filament are manufactured in standard commercial diameters, which are usually slightly different from the theoretically correct diameter. The second difficulty results from the choice of lead dimensions which may not give a value of $2\Delta V$ exactly equal to 0.55 volt, as illustrated in Fig. 4. Accordingly, to adjust for these two slight discrepancies, one must design an actual filament to compensate for them, by making a slight change in the length of filament.

Specifically, to find the dimensions of the tungsten filament and the two nickel leads corresponding to any desired value of resistor coefficient $k$, one proceeds as follows:

1. Find from line B Fig. 5, the theoretical filament diameter corresponding to $k$, and select the nearest standard filament diameter.
2. Find from Equation 18 or from a special table the value of the filament current $I_{28}$ at $T_m = 2800°$ K. applying to the selected standard diameter.
3. Find $V_m'$ from Equation 8 or from a special table.
4. Assume a lead diameter and a lead length long enough for convenient manufacture, but not too long to exceed the maximum value of $I_{LL}$ given at the right-hand limit of the appropriate curve in Fig. 4.
5. Compute $V = kI^{1.85}$.
6. Subtract .01 or .02 volt from V as an arbitrary correction for voltage drop in the leads. The result is $V_F$, the filament voltage. (A more accurate determination of the voltage drop in the leads does not justify the time required.)
7. Find the actual value of $2\Delta V$, corresponding to $I_{LL}$, from Fig. 4.
8. Compute $V_m = V_F + 2\Delta V$.
9. Compute $L_F = V_m / V_m'$.

A non-linear resistor comprising a single uncoiled tungsten filament, supported at its ends by two nickel leads, has the desired volt-ampere characteristic over a suitable range of currents when the dimensions of the filament and leads are determined according to the preceding description. As shown by lamps 36 and 36d of Fig. 6, the filament may be straight throughout its length, or it may be curved, as indicated by lamp 36c, to accommodate leads of equal length, provided the spacing between the ends of the filament is kept sufficiently large to permit free radiation of heat without significant absorption by either filament of heat radiated from the other. Moreover, the lengths of the two filament leads need not be identical, as exemplified by the lamp 36, and if the leads are of different lengths, one uses the average length of the leads to find the value of the voltage reduction $2\Delta V$ from Fig. 4.

The table below portrays the steps to be followed in designing non-linear resistors having coefficients of .50, 10, and 250 respectively. Similar steps would be followed for finding the specific filament and lead dimensions of non-linear resistors having other coefficients. In this connection, it should be pointed out that a wide range of values of the coefficients $k$ is required in order to represent the great variety of lengths, diameters and internal roughness of pipe lines encountered in actual pipe-line networks, and consequently it is proposed to provide a series of non-linear resistors, in which series the values of the successive coefficients $k$ will vary progressively by substantially 5%. Thus, having on hand an adequate stock of non-linear resistors, one may select for use in the electric network those resistors having coefficients $k$ which are most nearly analogous to the coefficients $z$ of the pipes of the pipe-line network to be represented in the electric network.

| Coefficient k | .50 | 10 | 250 |
|---|---|---|---|
| 1. Nearest standard diameter, mils | 7 | 2.35 | .75 |
| Nearest standard diameter, cm | .0178 | .00598 | .00191 |
| 2. Current at $T_m = 2800°$ K., amp | 4.38 | .854 | .155 |
| 3. $V_m'$, Equation 8, volts/cm | 1.48 | 2.58 | 4.50 |
| 4. Lead length, $L_L$, cm | 3 | 4 | 5 |
| Lead diameter, mils | 70 | 50 | 40 |
| Product $IL_L$ | 13.1 | 3.42 | .775 |
| 5. $V = kI^{1.85}$ | 7.52 | 7.46 | 8.00 |
| 6. $V_F = V - .01$ | 7.51 | 7.45 | 7.99 |
| 7. $2\Delta V$, Fig. 4 | 0.59 | 0.63 | 0.67 |
| 8. $V_m = V_F + 2\Delta V$ | 8.10 | 8.08 | 8.66 |
| 9. $L_F = V_m/V_m'$ | 5.47 | 3.14 | 1.93 |

The final values of filament length found above may be checked approximately by referring to the dotted line C of Fig. 5, which gives the theoretically correct filament length according to the general derivation. The lengths of the practical filaments should be close to the theoretically correct lengths.

Characteristics of non-linear resistors

An inherent characteristic of the non-linear resistors of this invention, hereinafter referred to as a "non-linear resistor lamp," is that the voltage across any non-linear resistor lamp, regardless of the value of its coefficient $k$, is very nearly the same for the same maximum filament temperature. Therefore, the operator of an electrical network analyzer employing non-linear resistor lamps, can judge the relative loss in head in each pipe line of a network simply by observing the brightness of the corresponding lamp. Moreover, at the normal incandescent lamp temperature of 2400° K., the resistor lamps all operate at substantially 4.6 volts and will satisfy the exponential equation almost exactly over a voltage range varying from 0.10 volt to 11.4 volts. A satisfactory current ratio of 7.9 to 1 constitutes the satisfactory operating range below a filament mid-section temperature of 2400° K.

Figure 7:
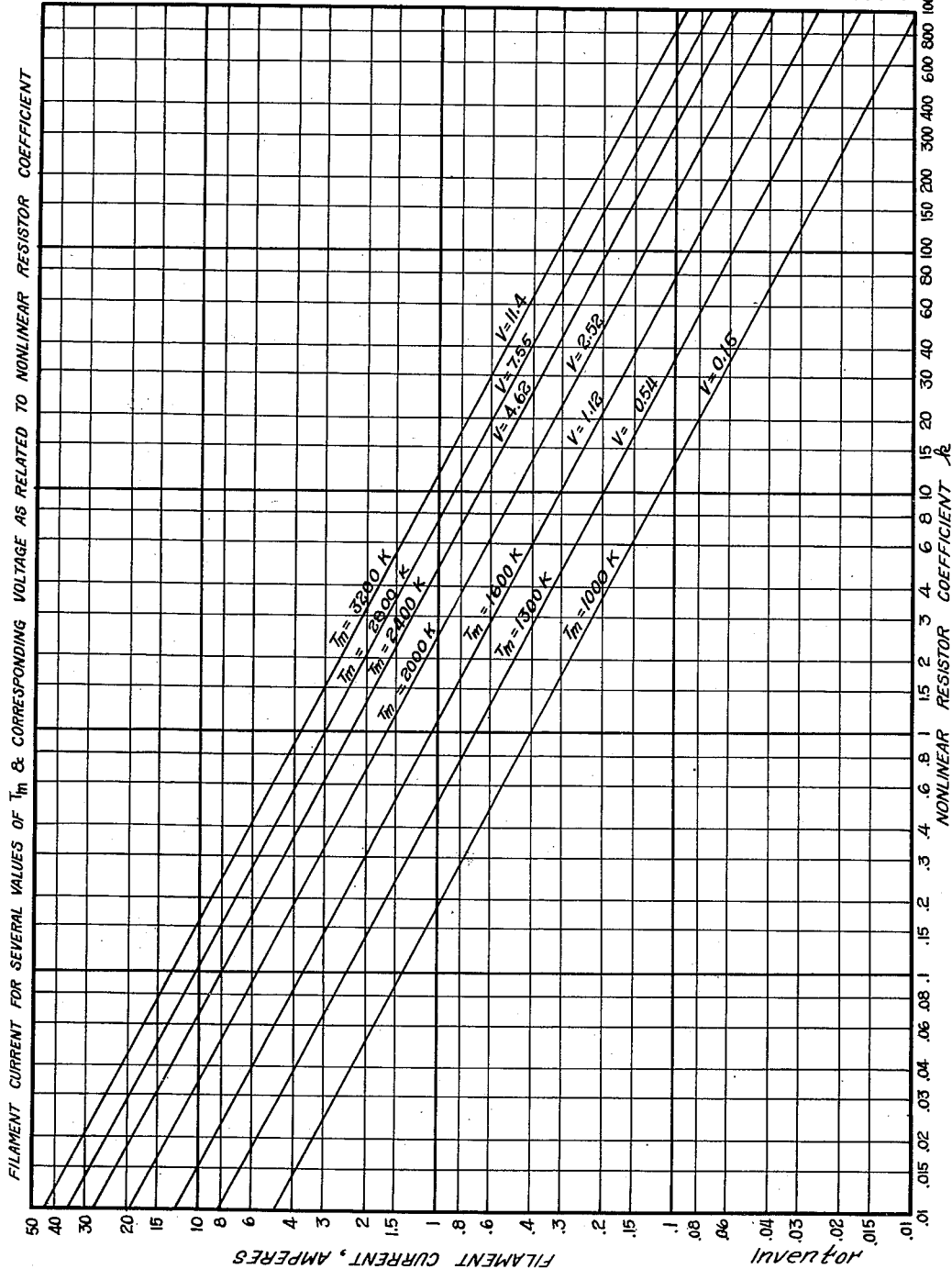
Fig. 7 is a graph showing values of current corresponding to a specific value of maximum temperature and filament voltage as a function of values of the coefficient $k$ of a non-linear resistor.

Other properties of the non-linear resistor lamps of this invention may be visualized from Fig. 7, which is a graph showing values of filament current corresponding to specific values of maximum temperature and filament voltage, as a function of values of the coefficient $k$ over a range from 0.01 to 1000. It has been found that fluid flows tend to decrease with increasing values of pipe-line head-loss coefficients $z$ and, therefore, since the safe operating current for a non-linear resistor lamp decreases as its coefficient $k$ increases, the non-linear resistor lamps are well suited to a pipe-line network analysis.

Although the foregoing discussion and description of the non-linear resistor lamps of this invention have been concerned with the use of one resistor lamp in each line of a closed circuit of the network, there may be instances in which the safe operating voltage of a resistor lamp may be exceeded during the analysis of a pipe-line network, or where a resistor lamp of the desired rating to represent a certain pipe line may not be available. In such unusual cases, series or parallel combinations of the resistor lamps may be used, based upon the two following observations:

1. The combined coefficient of two or more of the non-linear resistors connected in series is the sum of their individual coefficients.

2. The combined coefficients of $h$ identical non-linear resistors in parallel, each of whose coefficients is $k$, is $$\frac{k}{h^{1.85}}$$

Since these combinations still obey the basic exponential law, the possibility of using series or parallel combinations of the non-linear resistor lamps makes the usefulness of the lamps almost unlimited in their application to the electrical analysis of fluid network systems.

For convenience, in adding additional non-linear resistor lamps in series or in parallel in any given socket 21 of a network, adapters, such as indicated at 40 in Fig. 2, are provided which may be screwed into any resistor socket 21 of the network, the adapter shown, in the present embodiment, having three sockets for receiving from one to three non-linear resistor lamps 20.

Referring again to Fig. 6, the specific design of a non-linear resistor lamp 20 is a compromise of cost, space, safe bulb temperature, and convenience in assembly. To obtain the best design subject to these criteria, the manufacturer may use a straight filament, as shown in forms 38, 38a and 38d, or a curved filament as shown at 38c; he may use a cylindrical bulb as at 36d, a pear-shaped bulb 36a or other forms including those shown herein; and he may use a large variety of lamp bases 37 and sockets 21. Moreover, the filament may be supported at its opposite ends or at a point or points intermediate the ends at which it is connected to the leads, as shown, for example, at 38b of Fig. 6, the one guiding requirement for the non-linear resistor lamps being that they have the desired exponential volt-ampere characteristics as dictated by the law of fluid-flow in a pipe line.

Although the exponent 1.85 is used herein to illustrate one application of the invention, some prefer to use an exponent having a different value which, for example, may be designated as $n$; then the voltage-current relation to be followed is:

$$V = k_n I^n$$

It has been found that if the non-linear resistor lamps of this invention are used to represent the above equation, the over-all error in network analysis is negligibly small. Thus, by way of example, if $n$ were 2, then assuming an average voltage $V_x$ of 3.5, across all the non-linear resistor lamps of the network, the coefficient $k_2$ for the square law would be 50, as compared to the value of 40.8 for the coefficient of a non-linear resistor having the exponent 1.85. This difference is illustrated graphically in Fig. 8 wherein the voltage across the non-linear resistor is a little too high for currents less than a selected value $I_x$ and a little too low for currents greater than the selected value, but the sum of all the positive and negative errors of any network will be found to be of the order of 1% or 2% for the total system, which is less than the error inherent in estimating the smoothness coefficient in the pipe lines of the network.

Operation

In analyzing any hydraulic network by means of the electrically analogous network, the analysis is conducted as though the entire pipe-line network were located at one altitude, and simple additive corrections are made for variations in altitude after completing the analysis based upon friction loss alone.

In general, in order to analyze the fluid-flow and head-loss of any particular pipe line of the hydraulic network of Fig. 1 by means of the electrically analogous network of Fig. 2, the engineer first ascertains from suitable tables the coefficient $z$ of each pipe of the pipe-line network. He then selects non-linear resistor lamps 20 having analogous coefficients $k$, and inserts each into a conductor 18, 19, 30, 31, etc., of the electric network which corresponds respectively to a pipe of the pipe-line network. Thus, for example, assuming that the pipe-line network 10 includes a pipe 13 which is 450 feet long and 8 inches in diameter and has a smoothness coefficient of 80, its coefficient $z$ would be ascertained from head-loss coefficient tables and, for the particular pipe specified above, is $5.71 \times 10^{-5}$. Hence, to represent in the electric network a pipe line 13 of the hydraulic network having a coefficient $z$ of $5.71 \times 10^{-5}$, one multiplies $z$ by the aforementioned scale factor $\lambda = 3.48 \times 10^{+6}$ to find the non-linear resistor lamp coefficient $k$. The latter, as described in the example given above, equals 198. A non-linear resistor lamp 20 having this coefficient is then inserted into the socket 21 of the conductor 30 corresponding to the pipe line 13 of the hydraulic network. Similarly, every other non-linear resistor lamp 20 of the network would be selected so as to maintain a current-voltage relationship in its respective conductor, analogous to the fluid-flow and friction head-loss relationship of the corresponding pipe of the pipe-line network.

To operate the network, one must adjust load currents so as to be analogous to fluid-flow rates at the point or points of fluid draw-off, such as at the hydrant 16, by manipulating the load rheostat 26′ while at the same time adjusting the source rheostats 33′ and 34′ to maintain a difference in potential between the source-terminals 33 and 34 analogous to the difference in fluid head between the fluid sources or reservoirs 15 and 15′ of the pipe-line network, as indicated in Fig. 1. In this connection, it should be pointed out that the same scale factor G should be used in relating the direct current source and load currents of the electric network to the corresponding fluid-flows of the pipe-line network, as was used in determining the relationship between the coefficients $k$ of the non-linear lamps and the coefficients $z$ of the corresponding pipes.

Thus, having set up and adjusted the electric network in the above manner, the voltage drop across the resistor lamp 20 of the pipe line 30 may be determined by connecting the voltmeter V to the junction-jacks 22 of the conductor 30. Since the voltage-drop across any non-linear resistor lamp 20 is related to the head-loss in the pipe line it represents, by an arbitrarily chosen scale factor B equaling volts per foot friction head-loss, the value recorded on the voltmeter may be read directly in feet of friction head-loss. Similarly, the fluid-flow in the pipe line 30 may be determined by connecting the ammeter A to the corresponding ammeter-jack of the conductor 30, the reading of the ammeter being related to the fluid-flow rate by a scale factor G equaling amperes per gallon per minute, so that the fluid-flow in the pipe 30 of the pipe-line network may be read directly from the ammeter in gallons of fluid per minute. Each of the aforementioned readings may then be modified to take into account the variation in altitude of different sections of the pipe-line network so as to give substantially exact measurements of the fluid-flows and friction head-losses in the pipe lines thereof.

The foregoing description relates in particular to the electrical analysis of a hydraulic pipe-line network. The electrical analysis of a network for gas of substantially-constant density is carried out in like manner. However, a modified procedure must be followed in making an electrical analysis of gases whose densities vary appreciably throughout the network. To analyze such a network, each source-terminal of the network corresponding to points of gas input should be energized at a voltage proportional to the square of the absolute pressure maintained at the gas source. Moreover, each load should be adjusted to carry the current proportional to the corresponding gas-flow rate $Q_a$. Then, the currents through the network are distributed correctly to represent proportional gas-flow rates. The voltages, however, across the non-linear resistors 20 are not proportional to pressure losses in the pipe lines, but are proportional to the differences in the squares of absolute pressures between the ends of the pipe lines, and hence in order to find the pressure-loss in any pipe line, one first measures the voltages from the two terminals of the corresponding non-linear resistor to a reference voltage. He then finds the corresponding squares of absolute pressures by applying the arbitrary scale factor and subsequently finds the square roots of these values to give the actual pressures present at the ends of the pipe line. The difference between these two pressures for any pipe line is the friction head-loss in that pipe line.

It will be clear that the present invention relates to the discovery of a superior electrical resistor and more particularly to a novel non-linear resistor for use in an electrical analogous network for analyzing the fluid-flow and friction head-loss characteristics of a fluid pipe-line network and that by employing the non-linear resistors of this invention, all computation and substantially all guesswork is eliminated in the determination of the fluid-flow and head-loss of the hydraulic network being tested; these characteristics of the fluid network being read directly from suitable instruments of the electrically analogous network. Moreover, the non-linear resistors provide visual means for recognizing normal and abnormal conditions in each pipe of a fluid pipe-line network. And, further, the non-linear resistors are adapted to have a wide variety of coefficients corresponding to the wide variety of pipe coefficients encountered in fluid pipe-line networks, and yet all of the non-linear resistors are operable over a wide current-and-voltage range.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In an electric network for analyzing pipe-line networks, the combination including: a closed circuit comprising a plurality of interconnected conductors arranged to simulate pipes in a pipe-line network to be tested; a power source connected to said closed circuit at a junction of said interconnected conductors for supplying current to the said circuit at a rate proportional to the rate of delivery of fluid to the said pipe-line network; a load connected into the said closed circuit for withdrawing current therefrom at a rate proportional to the rate of withdrawal of fluid from the pipe-line network; and a multiplicity of non-linear resistors respectively interposed in the said conductors of the said closed circuit, each of the non-linear resistors of the said multiplicity thereof having an exponential volt-ampere characteristic such that the voltage across its terminals varies as a power of the current through it and which power is a substantially-fixed value and is within the range from about the 1.7 power to about the 2.0 power, a plurality of the said multiplicity of non-linear resistors each differing from another plurality thereof in resistance-values at a given voltage, and each non-linear resistor of the said multiplicity thereof having the said exponential volt-ampere characteristic over a range of at least four volts.

2. In an electric network for analyzing pipe-line networks, the combination including: a closed circuit comprising a plurality of interconnected conductors arranged to simulate pipes in a pipe-line network to be tested; a power source connected to said closed circuit at a junction of said interconnected conductors for supplying current to the said circuit at a rate proportional to the rate of delivery of fluid to the said pipe-line network; a load connected into the said closed circuit for withdrawing current therefrom at a rate proportional to the rate of withdrawal of fluid from the pipe-line network; and a multiplicity of non-linear resistors respectively interposed in the said conductors of the said closed circuit, each of the non-linear resistors of the said multiplicity thereof having an exponential volt-ampere characteristic such that the voltage across its terminals varies as a power of the current through it and which power is a substantially-fixed value and is within the range from about the 1.7 power to about the 2.0 power, a plurality of the said multiplicity of non-linear resistors each differing from another plurality thereof in resistance-values at a given voltage, and each non-linear resistor of the said multiplicity thereof having the said exponential volt-ampere characteristic over a range of at least 7.5 volts.

3. In an electric network for analyzing pipe-line networks, the combination including: a closed circuit comprising a plurality of interconnected conductors arranged to simulate pipes in a pipe-line network to be tested; a power source connected to said closed circuit at a junction of said interconnected conductors for supplying current to the said circuit at a rate proportional to the rate of delivery of fluid to the said pipe-line network; a load connected into the said closed circuit for withdrawing current therefrom at a rate proportional to the rate of withdrawal of fluid from the pipe-line network; and a multiplicity of non-linear resistors respectively interposed in the said conductors of the said closed circuit, each of the non-linear resistors of the said multiplicity thereof having an exponential volt-ampere characteristic such that the voltage across its terminals varies as a power of the current through it and which power is a substantially-fixed value and is within the range from about the 1.7 power to about the 2.0 power, a plurality of the said multiplicity of non-linear resistors each differing from another plurality thereof in resistance-values at a given voltage, and each non-linear resistor of the said multiplicity thereof having the said exponential volt-ampere characteristic over a range of at least four volts within the range from about 0.1 volt to about 11.4 volts.

4. In an electric network for analyzing pipe-line networks, the combination including: a closed circuit comprising a plurality of interconnected conductors arranged to simulate pipes in a pipe-line network to be tested; a power source connected to said closed circuit at a junction of said interconnected conductors for supplying current to the said circuit at a rate proportional to the rate of delivery of fluid to the said pipe-line network; a load connected into the said closed circuit for withdrawing current therefrom at a rate proportional to the rate of withdrawal of fluid from the pipe-line network; and a multiplicity of non-linear resistors respectively interposed in the said conductors of the said closed circuit, each of the non-linear resistors of the said multiplicity thereof having an exponential volt-ampere charactistic such that the voltage across its terminals varies as a power of the current through it and which power is a substantially-fixed value and is within the range from about the 1.7 power to about the 2.0 power, a plurality of the said multiplicity of non-linear resistors each differing from another plurality thereof in resistance-values at a given voltage, and each non-linear resistor of the said multiplicity thereof having the said exponential volt-ampere characteristic over a range of at least 7.5 volts within the range from about 0.1 volt to about 11.4 volts.

5. In an electric network for analyzing pipe-line networks, the combination including: a closed circuit comprising a plurality of interconnected conductors arranged to simulate pipes in a pipe-line network to be tested; a power source connected to said closed circuit at a junction of said interconnected conductors for supplying current to the said circuit at a rate proportional to the rate of delivery of fluid to the said pipe-line network; a load connected into the said closed circuit for withdrawing current therefrom at a rate proportional to the rate of withdrawal of fluid from the pipe-line network; a multiplicity of non-linear resistors respectively interposed in the said conductors of the said closed circuit, each of the non-linear resistors of the said multiplicity thereof having an exponential volt-ampere characteristic such that the voltage across its terminals varies as a power of the current through it and which power is a substantially-fixed value within the range from about the 1.7 power to about the 2.0 power, a plurality of the said multiplicity of non-linear resistors each differing from another plurality thereof in resistance-values at a given voltage, and each non-linear resistor of the said multiplicity thereof having the said exponential volt-ampere characteristic over a range of at least four volts; junction-jacks at the intersections of the said plurality of interconnected conductors of said closed circuit for measuring the voltage-drop across the terminals of the non-linear resistor of each respective conductor; and an ammeter-jack in each conductor of said closed circuit for measuring the current-flow therethrough.

6. In an electric network for analyzing pipe-line networks, the combination including: a closed circuit comprising a plurality of interconnected conductors arranged to simulate pipes in a pipe-line network to be tested; a variable power source connected to said closed circuit at a junction of said interconnected conductors for supplying current to the said circuit at a rate proportional to the rate of delivery of fluid to the said pipe-line network; a variable load connected into the said closed circuit for withdrawing current therefrom at a rate proportional to the rate of withdrawal of fluid from the pipeline network; a lamp-socket connected in each conductor of said closed circuit; and an evacuated long-filament resistor-lamp mounted in each lamp-socket of said closed circuit, each of the long-filament resistor-lamps having an exponential volt-ampere characteristic such that the voltage across its terminals varies as the power of the current through it and which power is a substantially-fixed value within the range from about the 1.7 power to about the 2.0 power, the resistance-values of the long-filament resistor-lamps of a plurality of said conductors differing from the resistance-values of the long-filament resistor-lamps of another plurality of said conductors, and each long-filament resistor-lamp of said circuit having the said exponential volt-ampere characteristic over a range of at least four volts; junction-jacks at the intersections of the said plurality of said interconnected conductors of said closed circuit for measuring the voltage-drop across the terminals of the long-filament resistor-lamp of each respective conductor; and an ammeter-jack in each conductor of said closed circuit for measuring the current-flow through the respective long-filament resistor-lamp therein.

7. In an electric network for analyzing pipeline networks, the combination including: a closed circuit comprising a plurality of interconnected conductors arranged to simulate pipes in a pipe-line network to be tested; a variable power source connected to said closed circuit at a junction of said interconnected conductors for supplying current to the said circuit at a rate porportional to the rate of delivery of fluid to the said pipe-line network; a variable load connected into the said closed circuit for withdrawing current therefrom at a rate proportional to the rate of withdrawal of fluid from the pipe-line network; a lamp-socket connected in each conductor of said closed circuit; and an evacuated long-filament resistor-lamp mounted in each lamp-socket of said closed circuit, each of the long-filament resistor-lamps having an exponential volt-ampere characteristic such that the voltage across its terminals varies as the power of the current through it and which power has a substantially-fixed value of 1.85, the resistance-values of the long-filament resistor-lamps of a plurality of said conductors differing from the resistance-values of the long-filament resistor-lamps of another plurality of said conductors, and each long-filament resistor-lamp of said circuit having the said exponential volt-ampere characteristic over a range of at least 7.5 volts within the range from about 0.1 volt to about 11.4 volts; junction-jacks at the intersections of the said plurality of said interconnected conductors of said closed circuit for measuring the voltage-drop across the terminals of the long-filament resistor-lamp of each respective conductor; and an ammeter-jack in each conductor of said closed circuit for measuring the current-flow through the respective long-filament resistor-lamp therein.

MALCOLM S. McILROY.

REFERENCES CITED

The following references are of record in the file of this patent:

UNITED STATES PATENTS

| Number | Name | Date |
|---|---|---|
| 1,094,733 | Lyle | Apr. 28, 1914 |
| 1,470,788 | Weeks | Oct. 16, 1923 |
| 1,884,877 | Rypinski | Oct. 25, 1932 |

OTHER REFERENCES

M. I. T. Publication No. 110, entitled "Hydraulic Analysis of Water Distribution Systems by Means of an Electric Network Analyzer," by Thomas R. Camp and H. L. Hazen, published June 1935. (Copy of 26 pages in Div. 23, U. S. Patent Office.)